Oct. 27, 1953

J. R. VIRGIL 2,657,078

GASKET SEAL FOR PIPE JOINTS

Filed Aug. 19, 1949

INVENTOR.
John R. Virgil
BY
Mason, Kolehmainen, Rathburn & Wyss
Att'ys

Patented Oct. 27, 1953

2,657,078

UNITED STATES PATENT OFFICE 2,657,078

GASKET SEAL FOR PIPE JOINTS

John R. Virgil, Downers Grove, Ill.

Application August 19, 1949, Serial No. 111,238

2 Claims. (Cl. 285—152)

This invention relates to gasket seal for pipe joints. More particularly, the invention relates to pipe fittings of the type employed in air brake systems and the like, and the invention has for an object the provision of improved gaskets and fittings and the provision of new and improved methods for quickly and permanently repairing and sealing airline fittings of standard construction that have become defective through breakage of the pipe at the fittings.

There are presently available on the market, and in wide use in air brake systems, pipe fittings of the type known generally as reinforced flange unions, such, for example, as the so-called "Wabcotite" fittings employed in the well known "AB" systems of the Westinghouse Air Brake Company. Such fittings may be employed in pairs to provide a straight-through union between two air pipes, or may be individually employed to connect pipes to the various valves, cylinders, reservoirs and other component parts of the usual air brake system. In any event the fitting includes a flat body portion adapted to be bolted or otherwise securely fastened to a similar portion of another fitting or to a flat surface on the particular part to which the connection is being made, and the air pipe is threaded into the body portion, from which extends a tubular reinforcing flange of somewhat larger internal diameter than the air pipe. Threading the end of the pipe for connection to the fitting inevitably produces a line of weakness at the base of the threaded portion, and since all of the components of an air brake system are subjected to severe jars, shocks and vibration, breakage of the air pipes at or adjacent the fitting with the consequent failure or impairment of operation of the system has been found to present troublesome problems.

In an attempt to prevent or minimize such breakage, the tubular flanges in fittings of the type referred to above are provided at the outer ends thereof with clamping and anchoring means for rigidly supporting the pipe at a point spaced from the line of weakness; but even when so supported, breakage of the air pipe is still encountered. Repair of the break or replacement of the air pipe in accordance with present practices involves a complicated and laborious process requiring the complete disassembly of the fitting and the pipe, and it is therefore a particular object of this invention to provide an improved method for repairing and sealing pipe breaks occurring within such fittings without disassembly of the pipe and the fitting, to provide a sealing gasket which may be employed in carrying out these improved methods, and to provide an improved fitting employing such gaskets.

In carrying out the invention in one form, a sealing gasket is provided, comprising a substantially annular body of resilient material having contiguous end portions which are separable to permit disposition of the body around a pipe and having a gate portion which extends axially from the body. More particularly, the gate portion has a radial width substantially equal to that of the annular body, and has an axial width at least equal to the axial width of the split anchor ring which forms a part of the above described conventional fitting. In effecting the repair of a fitting of this type in accordance with the method of the present invention, the clamping nut and the split anchor ring are removed from the tubular flange of the fitting body and slid along the pipe so that the resilient gasket may be disposed around the pipe with the gate portion extending into the space between the ends of the split anchor ring. Thereupon the clamping nut is tightened down so as to compress the gasket and the anchor ring between the nut and the end of the flange, whereby the gasket is uniformly forced into airtight sealing engagement with the pipe and the flange throughout the entire circumference thereof.

For a more complete understanding of the invention, reference should now be had to the drawing, in which.

Figure 1:
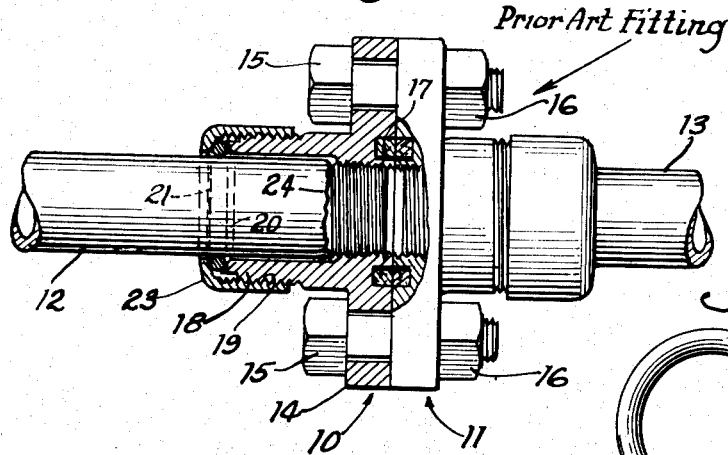
Fig. 1 is an elevational view, partly in section, of a straight-through unit employing a pair of conventional fittings of the type heretofore described.

Referring first to Fig. 1 of the drawing, a straight-through pipe union has been shown for purposes of illustration, which comprises a pair of identical pipe fittings 10 and 11 of the reinforced flange type well known in the art for connecting a pair of air pipes 12 and 13. Since the fittings 10 and 11 are of identical construction, only the fitting 10, which is shown in cross section, will be described in detail. This fitting 10 includes a flat body portion 14 adapted to be secured in face-to-face relation to the similar body portion of the fitting 11 by suitable bolts 15 and nuts 16. As previously indicated, however, the fitting 10 may instead be secured to a flat ported surface on a valve reservoir, cylinder or other component part of an air brake system and, as shown, the face of the body portion 14 is provided with a sealing gasket 17 for providing an airtight connection.

Figure 2:
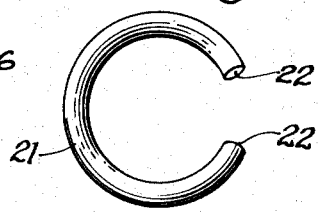
Fig. 2 is a detail view on a somewhat larger scale of one of the split anchor rings employed in the fittings of Fig. 1.
Figure 3:
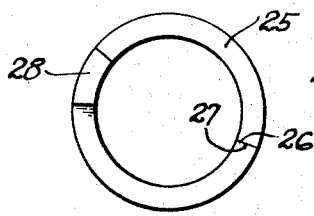
Figs. 3, 4 and 5 are respectively front elevational, perspective and side elevational views, on the same scale as Fig. 2, of the improved resilient gasket embodying the present invention.
Figure 4:
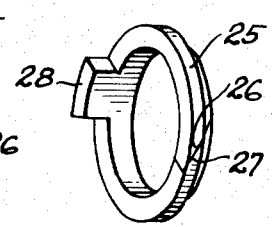
Figure 5:
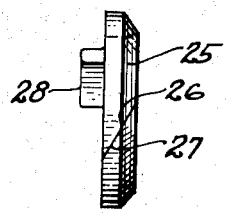

Centrally of the body portion 14 is a threaded opening for receiving the threaded end of the pipe 12 and a tubular flange 18 is provided extending outwardly from the body portion 14 in spaced relation to the pipe 12. The flange 18 is provided with external threads 19, as shown, and with an inwardly tapering end surface 20, which end surface 20 cooperates with a split anchor ring 21, having spaced apart end surfaces 22 (Fig. 2), when a cup-shaped clamping nut 23 is tightened on the threaded flange 18, the nut 23 having an opening 24 therein for receiving the pipe 12. As will be apparent from inspection of Fig. 1, and as is well understood by those skilled in the art, when the clamping nut 23 is tightened on the flange 18, the anchor ring 21 will be forced against the tapered surfaces 20 so as to firmly engage and support the pipe 12 at a point spaced from the threaded end portion thereof. However, as previously indicated, even though so supported the severe conditions of operation encountered by air brake systems often result in breakage of the pipe 12 at the line of weakness, as indicated by the reference numeral 24 in Fig. 1. In order to repair the break or to replace the pipe 12 so as to restore the air brake system to proper operating condition, it is necessary in accordance with prior art practices not only to remove the clamping nut 23 so as to release the pressure of the anchor ring 21 on the pipe 12, but it is also necessary to remove all of the bolts 15 in order that the body portion 10 and the broken pipe may be disassembled for repair or replacement.

In accordance with the present invention, however, permanent repair of the fitting so as to provide a tightly sealed and satisfactory pipe connection at the fitting 10 regardless of the break 24 may be effected by employing a novel sealing gasket 25 of the type shown in Figs. 3 to 6, inclusive. This gasket 25, as shown, comprises an annular body portion which is formed of resilient material such as rubber or the like and which is of substantially the same diameter as the anchor ring 21. On one side thereof, the body portion of the gasket 25 is split along a transverse, obliquely extending line, as shown best in Figs. 4 and 6, so as to provide contiguous end portions 26 and 27, which are normally in overlapping relation but which may be spread apart due to the resilient character of the gasket 25 so as to permit the gasket to be positioned over a pipe such as the pipe 12, for example.

Extending axially from the body portion of the gasket 25 and preferably formed integrally therewith is a gate portion 28 having a sufficiently narrow circumferential length to permit insertion of the gate portion between the spaced end surfaces 22 of the anchor ring 21, the radial thickness of the gate portion 28 being substantially equal to the radial thickness of the body portion and the axial width of the gate portion being at least as great as the cross-sectional diameter of the anchor ring 21.

Figure 6:
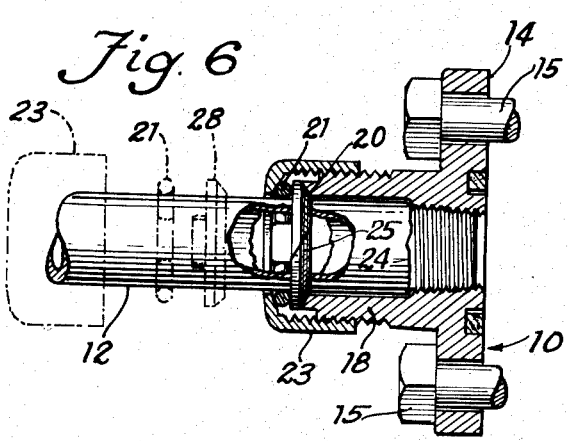
Fig. 6 is a view similar to Fig. 1 showing one of the fittings of Fig. 1 after it has been repaired in accordance with the present invention, the method of effecting repair of the gasket being indicated by the broken line positions of the various parts.

Referring now to Figs. 1 and 6 and assuming that it is desired to repair the break 24 in the pipe 12, it is necessary only to withdraw the clamping nut 23 and the anchor ring 21 from the fitting 10 by sliding them along the pipe 12, for example, to the respective positions shown in broken lines in Fig. 6. The resilient gasket 25 may then be disposed around the pipe 12 by separating the end surfaces 26 and 27, the gasket being positioned as shown in Fig. 6 in broken lines intermediate the anchor ring 21 and the fitting 10. The resilient gasket member and the anchor ring 21 are then assembled together so that the gate portion 28 of the gasket member extends into the space between the ends 22 of the ring 21 and the clamping nut 23 is then tightened down on the flange 18 of the fitting 10 so that the parts assume the heavy line position shown in Fig. 6. Upon tightening of the clamping nut 23, the resilient gasket member 25 and the anchor ring 21 will be compressed between the clamping nut and the tapered end surfaces on the flange 18, the nut engaging not only the outer circumference of the anchor ring 21 but also the outer edge of the gate portion 28 of the gasket 25 so that resilient body portion of the gasket will be uniformly forced into sealing engagement with the tapered surface 20 and the outer periphery of the pipe 12 throughout the entire circumference thereof. It will thus be seen that the outer end of the tubular flange 18 will be tightly sealed and consequently leakage of air from the fitting is prevented regardless of the break in the pipe 12 at the point 24. Repair of broken pipes may thus be quickly and permanently effected without disassembly of the pipe and the fitting or, if desired, improved fittings incorporating the resilient split gasket and gate may be originally employed so as to eliminate the dangers of failure of the system due to breakage of the pipe within the fitting.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. A sealing gasket for air-pipe fittings comprising a substantially annular body of resilient material, said body being transversely and obliquely split to provide contiguous overlapping end portions which are separable to permit disposition of said body around a pipe, and a single circumferentially narrow gate portion having a radial width substantially equal to that of said body and extending axially therefrom.

2. In a pipe fitting of the type including an internally threaded body for receiving a pipe and a split anchor ring having spaced apart ends and adapted to be forcibly engaged with an external diameter of said pipe upon pressure against an end of said body by a clamping nut threadedly engaging said body, the combination of a sealing gasket comprising an annular body of resilient material, said body being transversely and obliquely split to provide contiguous overlapping end portions which are separable to permit disposition of said body around said pipe between said end of said fitting body and said anchor ring, and a gate portion extending axially from said annular body at a point substantially opposite said contiguous end portions for gating the space between said ends of said anchor ring, said gate portion having an axial width at least as great as that of said anchor ring, whereby said gasket is uniformly forced into sealing engagement with said end of said fitting body and said pipe by said anchor ring and said clamping nut.

JOHN R. VIRGIL.

References Cited in the file of this patent

UNITED STATES PATENTS

| Number | Name | Date |
|---|---|---|
| 481,105 | Cook | Aug. 16, 1892 |
| 624,305 | Crabill | May 2, 1899 |
| 1,440,207 | Burns | Dec. 26, 1922 |
| 1,956,683 | Hewitt | May 1, 1934 |
| 1,959,607 | Anderson | May 22, 1934 |
| 2,017,717 | Heeter | Oct. 15, 1935 |
| 2,113,098 | Skinner | Apr. 5, 1938 |
| 2,174,105 | Haury | Sept. 26, 1939 |
| 2,383,959 | Dick | Sept. 4, 1945 |
| 2,452,277 | Woodling | Oct. 26, 1948 |